United States Patent
Lindner et al.

(10) Patent No.: US 6,695,115 B2
(45) Date of Patent: Feb. 24, 2004

(54) PROCESS FOR ADJUSTING A FRICTION CLUTCH SYSTEM

(75) Inventors: Joachim Lindner, Dittelbrunn (DE); Frank Hirschmann, Niederwerrn (DE); Reinhold Weidinger, Unterspiesheim (DE); Klaus Steinel, Bergrheinfeld (DE); Erwin Ziegler, Gressthal (DE); Wolfram Hick, Schwanfeld (DE); Norbert Lohaus, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/261,318

(22) Filed: Sep. 30, 2002

(65) Prior Publication Data
US 2003/0062239 A1 Apr. 3, 2003

(30) Foreign Application Priority Data
Oct. 1, 2001 (DE) .......................... 101 48 427

(51) Int. Cl.$^7$ .............................. F16D 13/75
(52) U.S. Cl. ................... 192/70.25; 192/18 R; 192/98; 192/111 A
(58) Field of Search ............................. 192/13 R, 18 R, 192/70.25, 111 A, 98, 15

(56) References Cited

U.S. PATENT DOCUMENTS

| | | | | |
|---|---|---|---|---|
| 3,202,247 A | * | 8/1965 | Schmidt et al. | 192/13 R |
| 4,445,600 A | * | 5/1984 | Schmidt | 192/18 R |
| 4,572,341 A | * | 2/1986 | Maucher | 192/13 R |
| 4,579,203 A | * | 4/1986 | Link | 192/15 |
| 2002/0060115 A1 | * | 5/2002 | Otto et al. | 192/13 R |

* cited by examiner

Primary Examiner—Saul Rodriquez
(74) Attorney, Agent, or Firm—Cohen, Pontani, Lieberman & Pavane

(57) ABSTRACT

A process for adjusting a friction clutch system of the type including a housing arrangement; a pressure plate; a stored-energy device supported against the housing and the pressure plate; a wear-compensating device installed in the path of support between the stored-energy device and one of the housing arrangement and the pressure plate, this device having a detection element on the pressure plate, which in association with a stop element fixed with respect to the housing arrangement, detects the amount of wear which has occurred in the friction clutch; a clutch-release mechanism for exerting force on the stored-energy device in the direction opposite its relaxation direction in order to carry out release operations; and a transmission shaft braking arrangement which is activated when a brake-release position is reached during a clutch-release operation. The process includes the following steps:

(a) using the clutch-release arrangement to adjust the stored-energy device to a basic pretension position from which the clutch-release arrangement moves through a brake-release stroke to reach a brake-release position; and (b) while the stored-energy device is held in the basic pretension position, adjusting at least one of the stop element and the detection element in such a way that the stored-energy device is released from the basic pretension position and the subsequent relaxation of the stored-energy device beyond the basic pretension position results in the activation of the wear-compensating device in such a way that, after completion of an adjustment process, the stored-energy device is still essentially in its basic pretension position when the friction clutch is engaged.

9 Claims, 5 Drawing Sheets

PROCESS FOR ADJUSTING A FRICTION CLUTCH SYSTEM

BACKGROUND OF THE INVENTION

1. Field of the Invention

The present invention pertains to a process for adjusting a friction clutch system such as that used in association with an unsynchronized transmission of a commercial vehicle.

2. Description of the Related Art

Especially when unsynchronized transmissions are used, it is known that a so-called transmission brake or transmission shaft brake can be provided on the friction clutch. During the execution of clutch-release operations, this brake has the effect of decelerating the transmission input shaft connected to the clutch disk or disks when a certain brake-release position is reached. It is necessary in this case for the various phases which occur during the execution of the clutch-release operation to be coordinated so that, in a first release phase, which begins with the clutch in the engaged position, initially only the clutch is actuated, that is, moved in the clutch-release direction. Then, after the clutch has been completely released, for example, further actuation of the clutch-release mechanism brings it into the brake-release position. As a result, depending on the extent to which the clutch has been actuated by the clutch-release mechanism, either only a release operation is performed, as in situations when no braking of the transmission shaft is required, or, if the actuation is strong enough, the brake release position is also reached and the transmission input shaft is braked.

The wear on the friction linings which occurs during the operation of the clutch has the result that the pressure plate, which is usually acted upon by a stored-energy device, moves closer to the flywheel as the thickness of the friction linings decreases. The stored-energy device copies this movement by relaxing and changing its installation position in a corresponding manner in, for example, the engaged state of the clutch. If a comparatively large amount of wear has resulted in a correspondingly pronounced change in the installation position of the stored-energy device, it is possible, during the execution of a clutch-release operation, for the clutch to be brought into its completely released state in the previously described first phase, but impossible for any further actuation, even up to the maximum possible degree of actuation beyond this point, to move the mechanism all the way to the brake-release position. It would thus no longer be possible for the transmission input shaft to be braked.

This problem can be solved, for example, by manually readjusting the clutch-release mechanism during the performance of periodic maintenance work. To do this, the part of the clutch-release mechanism acting on the brake element connected to the transmission input shaft is screwed out, for example, to shift it with respect to the area of the clutch-release mechanism which is connected to the stored-energy device for release movements in common; in this way, the change in the installation position of the area of the clutch-release mechanism connected to the stored-energy device can be compensated. It is thus possible to ensure that the clutch system is adapted to the wear state and that the transmission shaft braking function is preserved.

This manual readjustment is a very complicated operation in itself, but it also brings with it the danger that, for example, if maintenance is neglected or if very severe wear occurs between maintenance intervals, the transmission shaft braking function can be impaired or even lost completely.

SUMMARY OF THE INVENTION

It is the task of the present invention to provide measures which ensure that the transmission shaft braking function remains essentially the same throughout the operating life of a friction clutch.

According to a first aspect of the present invention, this task is accomplished by a process for adjusting a friction clutch system, where the friction clutch system comprises: a housing arrangement; a pressure plate; a stored-energy device, which is supported against the housing arrangement and the pressure plate; a wear-compensating device in the path of support between the stored-energy device and the housing arrangement or between the stored-energy device and the pressure plate with a detection element on the pressure plate, which element, in cooperation with a stop element which can be fixed in place with respect to the housing arrangement, detects the wear which has occurred in the system; a clutch-release arrangement, by means of which, to implement clutch-release operations, force can be exerted on the stored-energy device in the direction opposite its relaxation direction; and a transmission shaft brake arrangement, where, upon execution of a clutch-release operation, the transmission shaft braking arrangement is activated when the brake-release position is reached. The adjusting process comprises the following steps: (a) using the clutch-release arrangement to adjust the stored-energy device to a basic pretension position, where, starting from the basic pretension position, a release movement of the clutch-release arrangement by a distance equal to the brake-release stroke allows the brake-release position to be reached; and (b), while the stored-energy device is being held in the basic pretension position, adjusting the stop element and/or of the detection element in such a way that the release of the stored-energy device from the basic pretension position and the subsequent relaxation of the stored-energy device beyond the basic pretension position results in the activation of the wear-compensating device in such a way that, after completion of an adjustment process, the stored-energy device is still essentially in its basic pretension position when the friction clutch is engaged.

A first essential aspect of the present invention is that the clutch is provided with a wear-compensating device, which is basically designed to compensate for the wear which occurs in the area of the friction linings or in the area of the clutch and to keep the stored-energy device in an installation position which is essentially unaffected by wear. This means that, once the friction clutch has been adjusted, it is ensured that any wear which occurs does not lead to any impairment in the transmission shaft braking function which might be caused by a change in the installation position of the stored-energy device.

In addition, however, the present invention also provides measures which take advantage of the adjustment possibility within the friction clutch to ensure that the entire clutch system, when in the new state, can be adjusted so that the various components within the clutch on the one hand and the components in the area of the clutch-release arrangement and the transmission shaft braking arrangement on the other hand are brought into positions such that, again independently of the amount of wear which occurs during operation, only the clutch is actuated in a first defined phase of a clutch-release operation and brought into the completely released position, and that, upon actuation to a defined extent beyond this point, the previously mentioned brake-release position is reached, in which, through activation of the transmission shaft braking arrangement, the braking function is obtained. This therefore means that, once the system has been adjusted, the brake-release stroke required to activate the transmission shaft braking arrangement, i.e., the stroke which starts from the completely engaged position of the friction clutch, will always be the same, regardless of how much the wear has occurred during operation. The need to perform periodic manual adjustments is therefore eliminated.

To produce the braking action, it is possible, for example, for the transmission shaft braking arrangement to be activated by the force exerted on it by a braking element connected to the transmission shaft for rotation in common, the braking element itself being actuated by the clutch-release arrangement. The stored-energy device can easily be brought into the basic pretension position by placing, in step (a), an adjusting spacer between the braking element and the clutch-release arrangement and by actuating the clutch-release arrangement in such a way that it acts on the braking element via the adjusting spacer, the length of this spacer being equal to the brake-release stroke. It is also possible, in step (b), to shift the stop element axially with respect to the housing arrangement in such a way that its contact section comes to rest on the detection element.

In the case of friction clutch systems in which the process according to the invention can be used, it is possible, for example, for the wear-compensating device to comprise: an adjusting element, which can be moved with respect to the pressure plate during the execution of a wear-compensating adjustment, where the stored-energy device acts on the pressure plate by way of the adjusting element; an essentially wedge-like slider, which is pushed by pretension into an intermediate space formed between the pressure plate and the detection element, where the detection element is designed with the elasticity of a spring, one end being attached to the pressure plate, while the other end acts on the slider; and a blocking section on the slider or on the detector element, which limits the adjusting movement of the adjusting element which occurs under pretension.

According to an alternative aspect of the present invention, the previously mentioned task is accomplished by a process for adjusting a friction clutch system, where the friction clutch system comprises: a housing arrangement; a pressure plate; a stored-energy device, which is supported against the housing arrangement and the pressure plate; a wear-compensating device in the path of support between the stored-energy device and the housing arrangement or between the stored-energy device and the pressure plate, which device has a detection element on the pressure plate, which element cooperates with a stop element which can be fixed in place with respect to the housing arrangement to detect the wear which has occurred in the system, where the stop element on the housing arrangement essentially blocks movement in the direction away from the housing arrangement but not in the direction toward the housing arrangement, and where at least one driver area is provided on the stop element, which the stored-energy device approaches during the execution of a release process; a clutch-release arrangement, by means of which force can be exerted on the stored-energy device in the direction opposite its relaxation direction to execute the clutch-release operation; and a transmission shaft braking arrangement, where, upon execution of a clutch-release operation, the transmission shaft braking arrangement is activated when the brake-release position is reached. The adjusting process comprises the following steps: (a) providing the minimum of one driver area on the stop element approximately in such a way that, when the friction clutch system is correctly adjusted, the actuation of the clutch-release arrangement by a brake-release stroke essentially sufficient to reach the brake release position has the result of reducing essentially to zero the distance between the minimum of one driver area and the cooperating area of the stored-energy device, and that, in the engaged state, the detection element is in or near the state of mutual contact with the stop element; (b) positioning the stop element with respect to the housing arrangement in such a way that actuation of the clutch-release arrangement sufficient to reach the brake-release position has the result that the gap between the minimum of one driver area of the stop element and the area of the stored-energy device cooperating with the minimum of one driver area is reduced essentially to zero; and (c) executing of an actuation process of the clutch-release arrangement sufficient to reach the brake release position, where, if the distance between the minimum of one driver area and the stored-energy device is already zero before the brake-release position is reached, the stop element is shifted by the stored-energy device relative to the housing arrangement, i.e., in the direction toward it.

With this procedure, therefore, the execution of an actuating process sufficient to reach the brake-release position has the result that, if the stop element is not already in the correct position, it is now pushed until it assumes the position required for a correctly adjusted clutch. This is so because the driver has already been provided in such a way that it can interact in the correct manner with the stored-energy device. This eliminates the need for any additional adjusting measures and for any manual adjustments during subsequent operation.

It is possible, for example, for the minimum of one driver area to be provided on a driver element which is or can be connected to the stop element by a threaded connection.

The stop element can be held on the housing arrangement by a locking ring element. In a clutch system which can be used in association with this procedure, the wear-compensating device can comprise: an adjusting element, which can move relative to the pressure plate during the execution of an adjusting process, where the stored-energy device acts on the pressure plate by way of the adjusting element; an essentially wedge-shaped slider, which is pushed by pretension into an intermediate space between the pressure plate and the detection element, where the detection element is designed with the elasticity of a spring, one end of which is attached to the pressure plate, while the other end acts on the slider; and a blocking section on the slider or on the detection element, which limits the adjusting movement of the adjusting element which occurs under pretension.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
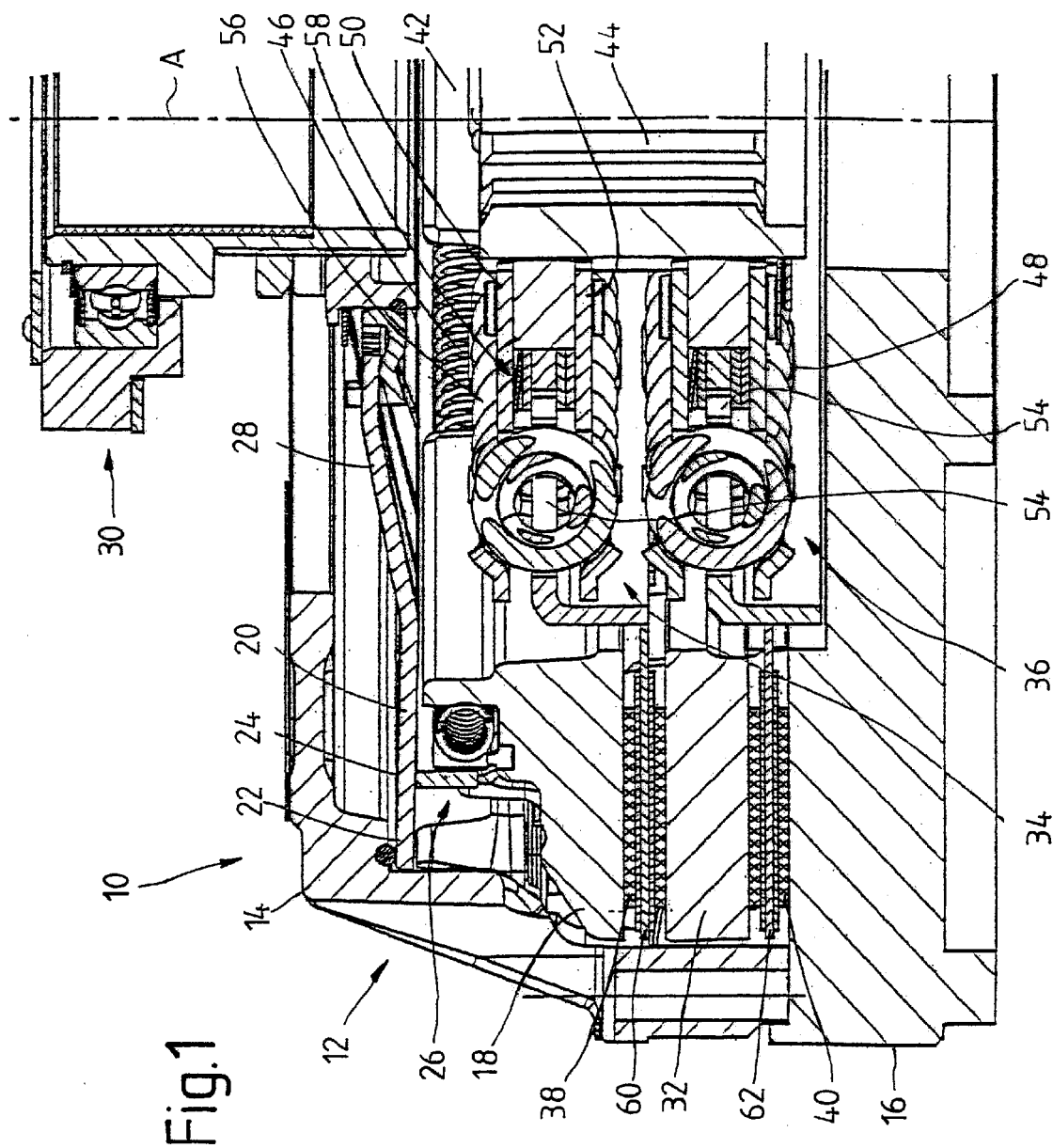
FIG. 1 is a partial longitudinal section view of a clutch system in which the process according to the invention can be used.

The essential principles of the design and function of a friction clutch in which the present invention can be realized are described in the following with reference to FIGS. 1–4.

The friction clutch 10 comprises a pressure plate assembly 12 with a housing 14, the radially outer area of which is or can be connected to a flywheel 16. The flywheel 16 can be designed as single mass, but it can also obviously be designed as a multi-mass flywheel. In the radially inner area, the flywheel 16 is designed so that it can be connected nonrotatably to a drive shaft, such as to the crankshaft of an internal combustion engine.

The pressure plate assembly 12 also includes a pressure plate 18, which is connected in an essentially nonrotatable manner by, for example, a plurality of tangential leaf springs or the like, to the housing 14, but is able to shift position with respect to the housing 14 within a limited axial range in the direction of an axis of rotation A. The radially outer area 22 of a stored-energy device 20, which can be designed, for example, as a diaphragm spring, is supported on the housing 14, whereas the area 24 farther inward in the radial direction acts on the pressure plate 18 by way of a wear-compensating device 26, to be described in greater detail further below. A release mechanism 30 for executing disengaging processes of the pull type acts on the spring tongues 28 located radially on the inside.

The pressure plate assembly 12 also includes an intermediate plate 32, which is also connected to the housing 14 with freedom to move within a certain axial range but without any freedom to rotate relative to the housing.

The pressure plate assembly 12, i.e., the friction clutch 10, comprises in addition two clutch disks, designated 34 and 36 overall. Each of these clutch disks has a friction lining 38, 40 in the radially outer area, and in the radially inner area they have a hub 42, the wedge-like teeth 44 or the like of which can be positioned nonrotatably on a power takeoff shaft, such as the input shaft to a transmission.

Each of the two clutch disks 34, 36 also has a torsional vibration damping arrangement 46, 48. The two torsional vibration damping arrangements 46, 48 are both designed in the same way in the example presented here and comprise, as will be described below on the basis of the clutch disk 34 in the following, two cover disk elements 50, 52, which are connected in the radially inner area to the hub 42 for rotation in common, either directly or via an additional predamper stage. Here, for example, the two cover disk elements 50, 52 can have sets of internal teeth which mesh with corresponding external teeth on the hub 42. Axially between the two cover disk elements 50, 52 is a central disk element 54. Both the cover disk elements 50, 52 and the central disk element 54 have spring windows with control edges in the circumferential direction, on each of which the end of damper spring 56 is supported in the circumferential direction. Several damper springs 56 in a row in the circumferential direction or groups of damper springs 56, nested radially inside each other, for example, can be provided as generally known in and of itself for torsional vibration damper arrangements normally provided for clutch disks. Because of the presence of the damper springs 56, a limited circumferential mobility of the central disk element 54 with respect to the associated cover disk elements 50, 52 is made possible. Here, in a manner known in and of itself, a stop for limiting rotational movement can be provided to prevent the damper springs 56 from being "set on block". In addition, a dry friction device, designated 58 overall in the figures, can be provided to contribute by Coulomb friction to the vibration damping above and beyond the damping effect provided by compression of the springs. As already explained, it is obviously possible to design the torsional vibration damping arrangements 46, 48 with several stages, such as through the provision of an additional set of cover disk elements axially farther toward the outside and an associated set of springs, which can then act between the cover disk elements 50, 52 and these additional cover disk elements.

The central disk elements 54 of the two clutch disks 34, 36 carry in their radially outer area disk-like friction lining carriers 60, 62, which again carry the friction linings 38, 40 via associated leaf springs or the like or can themselves be the spring linings.

In the engaged state, the stored-energy device 20 presses down via the previously mentioned wear-compensating device 26 on the pressure plate 18. This presses the friction linings 38 of the clutch disk 34 against the intermediate plate 32. The clutch disk 36 with its friction linings 40 can then be clamped between the intermediate plate 32 and the flywheel 16. As a result of this friction-locking connection, therefore, a nonrotatable connection is established between the pressure plate 18, the intermediate plate 32, and the flywheel 16 on the one side and the two clutch disks 34, 36 or the common hub 42 of the disks on the other. For the transition to the disengaged state, a pulling force is exerted on the spring tongues 28 of the stored-energy device 20. This moves area 24 of the device axially away from the flywheel 16, and the device thus releases at least some the force it is exerting on the pressure plate 18. Under the action of the previously mentioned tangential leaf springs or the like, the pressure plate 18 and the intermediate plate 32 are then also moved away axially away from the flywheel 16, so that, by the release of the clamping action, the two clutch disks 34, 36 are also released.

Figure 2:
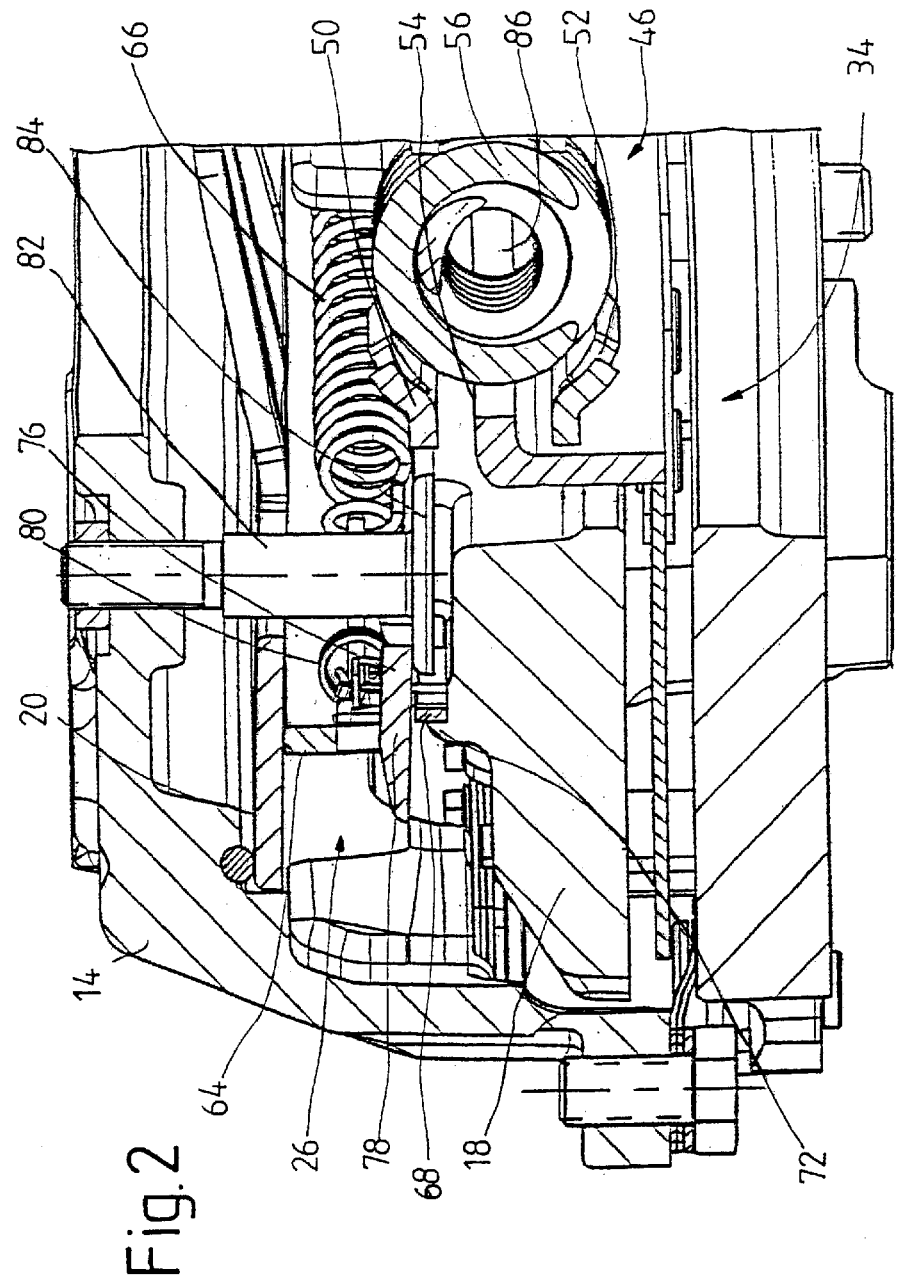
FIG. 2 is a partial longitudinal section view of a pressure plate assembly of the clutch shown in FIG. 1.
Figure 3:
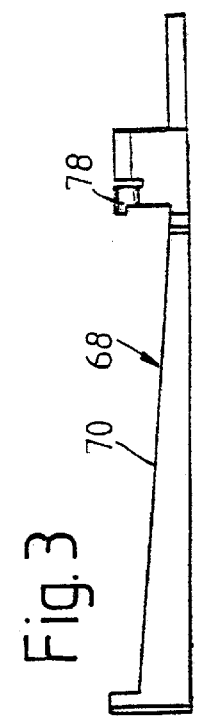
FIG. 3 is a side view of a slider used in the clutch according to FIG. 1.

In the following, the design and function of the wear-compensating device 26 is described with reference to FIGS. 2–4.

The wear-compensating device 26 comprises an adjusting 64 ring, one axial side of which is acted on by the stored-energy device 20. The other axial side of the adjusting ring 64 has several ramp or wedge surfaces arranged in a row in the circumferential direction; the height of these ramps changes in the circumferential direction. Axially opposite these surfaces are corresponding surfaces of the pressure plate 18. A rotation of the adjusting ring 64 has the result that the surface of the ring acted on by the stored-energy device 20 changes its axial level with respect to the pressure plate 18. As a result of the pretensioning spring 66, which can be designed as a helical tension spring, for example, the adjusting ring 64 is preloaded for rotational movement around the axis of rotation A with respect to the pressure plate 18 in the direction such that, upon release of the adjusting ring 64, the ring is pushed in the axial direction so that the surface of the ring actuated by the stored-energy device 20 moves away from the pressure plate 18. For this purpose, the pretensioning spring 66 is held in place at one end on the pressure plate 18 and at the other end on the adjusting ring 64.

The wear-compensating device 26 also includes a wedge-like, curved slider 68, the curvature of which conforms to the curved contour of the adjusting ring 64; a longitudinal section 70 of the slider rests against an inner circumferential area of an axial shoulder 72 on the pressure plate 18. The slider 68 is designed basically for sliding in the circumferential direction. One end of a leaf-like arresting element 76 is fixed in place at one end on the pressure plate 18; the other circumferential end 78 of the arresting element extends over the wedge-like elongated area 70 of the wedge-like slider 68. As a result of the leaf spring-like design, the arresting element 76 presses on the slider 68 and thus pushes it against the pressure plate 18. One end of another pretensioning spring 80 is hooked onto a hook section 78 of the slider 68, whereas the other end is hooked onto the end of spring 66 by which spring 66 is hooked onto the adjusting ring 64. As a result of the pretensioning spring 80, the slider 68 is induced to slide in one circumferential direction, this being the direction in which the increasingly larger axial dimension of the slider tries to fill up the area between the pressure plate 18 and the end area 78 of the arresting element 76. The arresting element 76, however, the end area 78 of which is pretensioned against the pressure plate 18, basically prevents the slider, 68 from executing this type of sliding movement in the circumferential direction.

Figure 4:
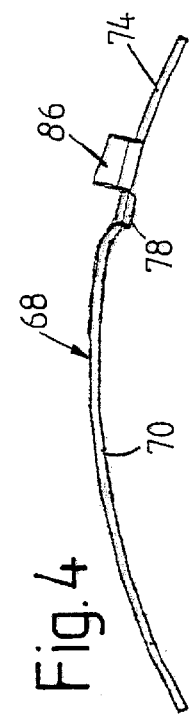
FIG. 4 is a plan view of the slider shown in FIG. 3.

It can be seen especially clearly in FIG. 4 that the slider 70 has a blocking section 86, which is bent outward in the radial direction. This blocking section 86 extends radially outward to engage in an associated circumferential opening in the adjusting ring 64; this circumferential opening, which cannot be seen in the figures, has a larger circumferential dimension than the blocking section 86. This therefore means that the blocking section 86 has a certain limited freedom to move circumferentially in this circumferential opening of the adjusting ring 64.

There is a stop element 82 on the housing 14, also radially inside the adjusting ring 64 and near the end area 78 of the arresting element 76. This stop can be designed as a threaded bolt, which is screwed into a corresponding threaded hole in the housing 14, and which has a mushroom-like head. The head 84 grips under the arresting element 76, that is, it projects into the space formed between the arresting element 76 and the pressure plate 18.

In the following, the way in which the wear-compensating device 26 functions upon the occurrence of wear, that is, upon abrasion of the friction linings 38, 40, is described.

The friction linings 38, 40 are subjected to heavy stress, especially during the execution of clutch-engaging operations, so that abrasion occurs primarily under these conditions. Abrasion of the friction linings 38, 40 of the two clutch disks 34, 36, however, has the result that the intermediate plate 32 and the pressure plate 18 are moved closer to the flywheel 16. The stored-energy device 20 basically follows along after this movement by changing its installation position correspondingly when in the engaged state. Once the wear reaches a certain point, the end area 78 of the arresting element 76 arrives in contact with the stop element 82, i.e., with the mushroom-shaped head 84 of this element. As the amount of wear becomes even greater, the previously described displacement of the pressure plate 18 toward the flywheel 16 has the result that the end area 78 of the arresting element 76 remains hanging on the stop element 82, which means that this end area 78 can no longer follow along after the displacement of the pressure plate 18. The intermediate space formed between the arresting element 76 and the pressure plate 18, which space is filled up by the wedge-like section 70 of the slider 68, thus becomes larger. This enlargement allows the slider 68 to move slightly in the circumferential direction. The displacement of the slider 68 in the circumferential direction thus ultimately corresponds to the amount of wear. This displacement of the slider 68 in the circumferential direction is possible in particular because the blocking section 86 has a certain circumferential play in the previously mentioned opening in the adjusting ring 64. Upon the occurrence of wear, therefore, first only a certain part of the arresting element 76 will be able to move axially with respect to the pressure plate 18, and in correspondence with that, the slider 68 will also move to a certain extent in the circumferential direction. The pretensioning spring 80 thus relaxes slightly. Because, in the engaged state, the adjusting ring 64 is acted on by the diaphragm spring, i.e., by the stored-energy device 20, this ring will not at first be able to rotate circumferentially with respect to the pressure plate 18. Only upon the performance of a release operation, that is, after the diaphragm spring 20 releases its comparatively strong force as a result of the above-mentioned pulling action and the contact force of the adjusting ring 64 on the stored-energy device 20 is defined essentially only by the previously mentioned tangential leaf springs, which also provide the release force, the adjusting ring 64 can, under the preloading effect of the pretensioning spring 66, move slightly in the circumferential direction until one of the circumferential ends of the opening in it makes contact with the blocking section 86. Because the circumferential movement of the slider 68 already corresponds with the wear which has occurred, the rotational movement of the adjusting ring 64, which becomes possible upon execution of a release operation, also corresponds to the wear which has occurred. Upon this rotational movement, the pretensioning spring 66 relaxes slightly, but simultaneously the pretensioning spring 80 is tensioned again somewhat more strongly. The result of this is that the pretensioning force applied by the spring 66 must be greater than the pretensioning force applied by the spring 80.

As a result of the rotation of the adjusting ring 64, which, upon occurrence of wear, becomes possible in the disengaged state, this ring will, as already mentioned, become displaced axially with respect to the pressure plate 18. The entire assembly clamped axially between the stored-energy device 20 and the flywheel 16, comprising the adjusting ring 64, the pressure plate 18, the clutch disk 34 in the area of its friction linings 38, the intermediate plate 32, and the clutch disk 36 in the area of its friction linings 40, thus retains an approximately constant axial dimension regardless of the amount of wear which has occurred. As a result, the stored-energy device 20 also retains approximately the same installed position. It should be pointed out here that, depending on the degree of inclination of the elongated, wedge-like area 70 of the slider 68, for example, the degree of compensation can be increased or decreased. It should also be pointed out that several of these sliders 68 and their associated arresting elements 76 or stop elements 82 can obviously be distributed around the circumference, although, to implement the previously described wear compensation, a single such slider is sufficient.

Figure 5:
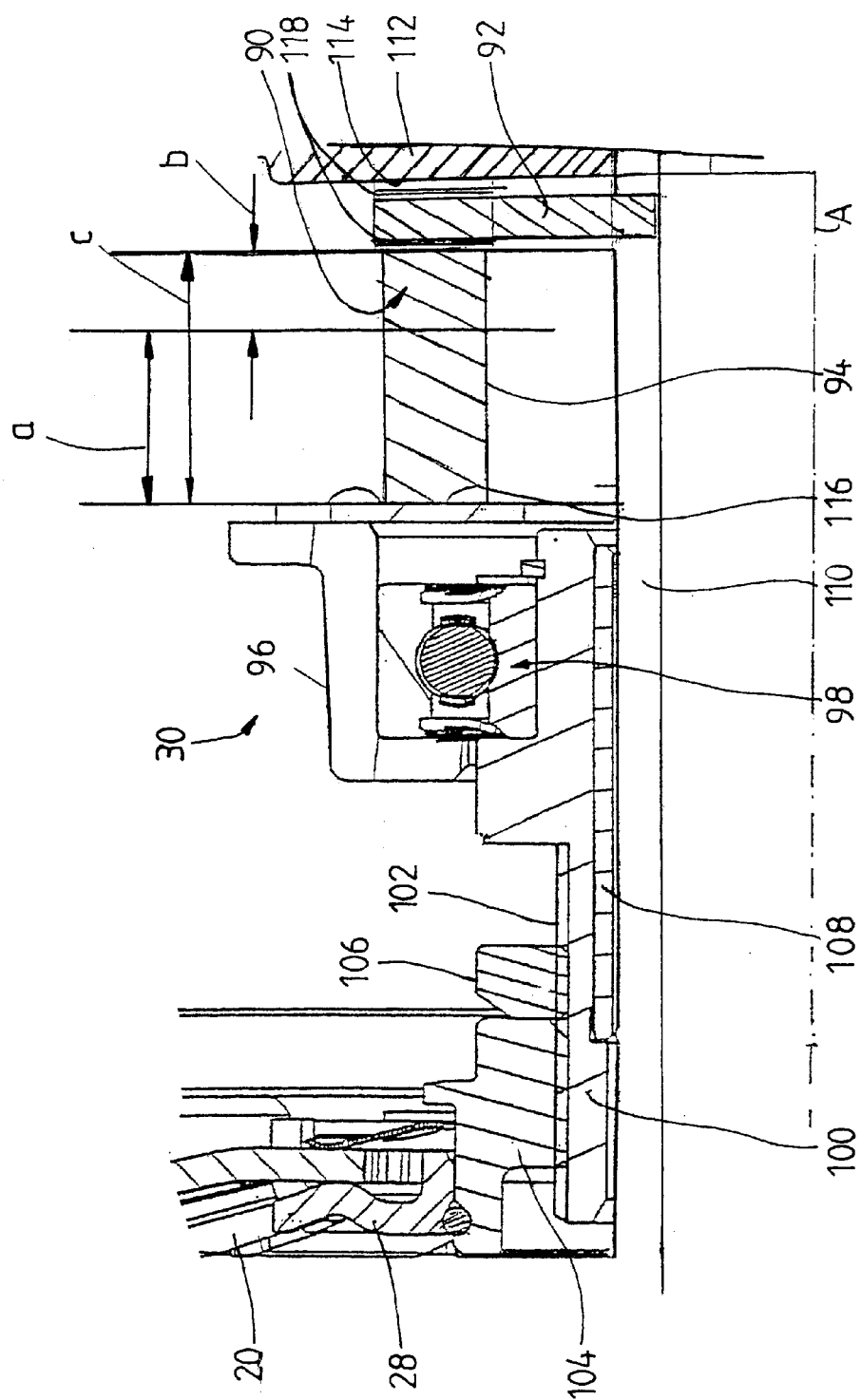
FIG. 5 is an enlarged view of the area of the clutch-release mechanism of the clutch shown in FIG. 1.

FIG. 5 shows the details of the clutch-release mechanism 30. This mechanism comprises an outer ring 96, upon which force can be exerted by a release fork or the like; this outer ring is connected by way of a release bearing 98 to an inner ring 100 in such a way that it cannot move in the axial direction but is free to rotate relative to the inner ring. The inner ring 100 has an outside thread 102 at one axial end, onto which a driver ring 104, connected to the stored-energy device 20 or to the spring tongues 28 of that device, is screwed. A lock nut 106 tightly connects the inner ring 100 to the driver ring 104, so that there is no danger of relative rotation and thus no danger of unwanted displacement of the release mechanism 30 with respect to the stored-energy device 28.

Inside the inner ring 100, a mounting element 108, for example, can be provided, in which a transmission input shaft 110, which is connected nonrotatably to the clutch disks 34, 36 (not shown in FIG. 5) or to the common hub 42 of the those disks, is rotatably supported. The transmission input shaft 110 extends into the transmission housing 112. The transmission housing 112 and the clutch-release mechanism 30 each have friction areas 114, 116, which, for example, can be formed by metal surfaces or by friction lining elements. A brake disk 92 is connected to the transmission input shaft 110 for rotation in common, where the brake disk 92 is approximately in the area of the transmission housing 112 and can move at least slightly relative to the transmission input shaft 110 in the direction parallel to the axis of rotation A. The brake disk 92 can carry, for example, friction linings 118.

In the following, the clutch-release operation of the clutch described above is explained. For this purpose, force is exerted on the outer ring 96 of the clutch-release mechanism 30 in such a way that it is moved toward the right in FIG. 5, that is, toward the transmission housing 112. Let it be assumed that, in FIG. 5, the various components are shown in the positions which they assume when the friction clutch 10 is in the engaged position. Starting from this first engaged position, the completion of a first stroke "a" by the clutch-release mechanism 30 or by the outer ring 96 of this mechanism brings the clutch into a completely or essentially completely released position. A further shift of the release mechanism 30 to the right, that is, toward the transmission housing 112, by a second stroke "b" causes the friction surface 116 to come in contact with the brake disk 92, and this brake disk 92 is pushed in turn against the transmission housing 112. Once these two strokes "a" and "b", which, when added together, correspond to the brake stroke "c", have been completed, a transmission shaft braking arrangement, designated 90 in general, is activated, and the transmission input shaft 110 is braked to achieve synchronization of the transmission. Thus, for example, the driver of the vehicle, by appropriately graduated actuation of the clutch pedal, or possibly an appropriate electronic driver circuit for the clutch, can ensure either that the clutch is moved only so far as to complete stroke "a" or that it is moved far enough to actuate the braking of the transmission input shaft 110, for which purpose the previously mentioned overall stroke "c", that is, the brake-release stroke "c", is required.

The correct functioning or correct coordination of the various strokes "a" and "b" with respect to each other so that, when stroke "b" is completed, the transmission shaft braking arrangement 90 is activated in a defined manner, requires that, in the engaged position, the stored-energy device 20 must occupy a basic pretension position which, because of the defined connection between the stored-energy device 20 and the clutch-release mechanism 30, ensures that the clutch-release mechanism 30 occupies the position shown in FIG. 5. This position may not change at any time during the entire life of the clutch, because, for example, the occurrence of wear in a clutch of the pull type shown in FIG. 1 could cause the radially inner area of the stored-energy device 20 to move away from the transmission housing 112 and thus, upon execution of a release operation, the transmission shaft braking arrangement 90 could not be activated even if the entire brake-release stroke "c" is completed. This wear-caused impairment of the functional characteristics is countered by the previously described wear-compensating device 26, which ensures that, even as the abrasion of the friction linings 38, 40 of the brake disks 34, 36 increases, the stored-energy device 20 will always stay approximately in the same position when the clutch is in the engaged state. In a clutch system of this type, however, measures must be taken to ensure that, even in the new state, the various components occupy the correct positions relative to each other. Measures according to the invention are described below which guarantee precisely this.

When a drive system is assembled, the first step is usually to screw the driver ring 104 onto the inner ring 100 appropriately so that, in the engaged state, the clutch-release mechanism 30 is already in the approximately correct position with respect to the brake disk 92. This will usually be only a rough adjustment, however, because manufacturing tolerances are present in the various components. In principle, however, after the final adjustments have been made to the clutch, the position of the clutch-release mechanism 30 with respect to the brake disk 92 will be as shown in FIG. 5; that is, after completion of the brake-release stroke "c", the two friction surfaces 114, 115 will exert frictional forces on the brake disk 92.

To obtain this position, according to the invention, a spacer 94 with, for example, a sleeve-like shape, but with an opening in its circumference, is first inserted between the brake disk 92 and the friction surface 116 of the clutch-release mechanism 30. The axial length of this spacer element 94 corresponds to the brake-release stroke "c". After the spacer 94 has been positioned as indicated in FIG. 5, force is then exerted on the clutch-release mechanism 30 in such a way that the friction surface 116 provided on the outer ring 96 presses the spacer element 94 against the brake disk 92. Thus the clutch-release mechanism assumes, in a defined manner, the position which it should occupy when a correctly adjusted clutch is in the engaged state. The stored-energy device 20 is then also in a basic pretension position, i.e., the position which this device is supposed to occupy when a correctly adjusted clutch is in the engaged state. If, however, in order to reach this position, it was necessary to shift the clutch-release mechanism 30 in FIG. 5 toward the transmission housing 112 in a way which forces the stored-energy device to undergo deformation in the process of reaching its basic pretension position, then the subsequent release of the clutch-release mechanism 30 would lead to relaxation of the stored-energy device 20, with the result that the previously assumed correct adjustment position would be lost again. To counteract this, while the clutch-release mechanism 30 is held in the position shown in FIG. 5 and therefore while the stored-energy device 20 is in the basic pretension position, the stop element 82 is now pushed in the axial direction with respect to the housing 14 in such a way that its head 84 comes to rest against the end area 78 of the arresting element 76. If it was necessary for the stored-energy device 20 to be deformed in a manner which increases its tension in the process of reaching its basic pretension position, then the pressure plate 18 is also shifted axially together with the adjusting ring 64 to an extent corresponding to this deformation, with the result that the end area 78 of the arresting element 76 is now farther away from the head 84 of the stop element 82. The above-mentioned adjustment of the stop element 82 can be accomplished, for example, by rotating it with respect to the housing 14, because, as can be seen in FIG. 2, for example, the stop element 82 is screwed by its externally threaded section into a nut attached to the housing 14. For this purpose, the end surface of the stop element 82, which is accessible from the outside, can, for example, be provided with a contour suitable for the engagement of a tool.

After this shifting procedure, the clutch-release mechanism 30, which is still being held in the position shown in FIG. 5, is released. If it was necessary to put the stored-energy device 20 under even more tension in order to reach the position shown in FIG. 5, this device will now relax, and the pressure plate 18 will shift back in the direction of the flywheel 16. It is impossible, however, for the end area 78 of the arresting element 76 to copy this slight shifting movement, because, as previously explained, the head 84 of the stop element 82 had previously been brought into contact with the end area 78. When the stored-energy device 20 now relaxes slightly, during which the pressure plate 18 moves to a certain extent toward the flywheel 16, the end area 78 of the arresting element 76 is therefore lifted from the slider 68; i.e., the size of the intermediate space formed between the end area 78 and the pressure plate 18 is increased. Thus the wedge-like longitudinal section 70 of the slider 68, under the pretensioning force, moves immediately to fill up this enlarged intermediate space. When a subsequent clutch-release operation is performed, as previously described with reference to the wear-compensating adjustment, the adjusting ring 64 will be able to turn with respect to the pressure plate 18, until it is held again by the blocking section 86.

An adjustment operation is therefore performed which functions in the same way as a wear-induced adjustment, except that this operation was necessary because there was a slight difference between the mounting or installation position of the stored-energy device existing in the engaged state and the basic pretension position which guarantees the correct function of the brake arrangement 90. This difference is compensated by the previously described adjusting process, so that, after the release operation has been performed and the accompanying adjustment has occurred, the stored-energy device is then held, when the friction clutch 10 is in the engaged state, in a position which corresponds to the basic pretension position and in which it is ensured that the clutch-release mechanism 30, which is connected to the stored-energy device 20 for axial movement in common, occupies the position shown in FIG. 5. As previously explained, it is then possible, by defined actuation of the clutch-release mechanism, to ensure that, upon completion of the brake release stroke "c", the brake-release position is assumed, i.e., the position in which the transmission input shaft 110 will be braked.

In the present invention, therefore, the wear-compensating device is used to compensate for the wear which occurs during operation and thus also to ensure that, for the preservation of uniform braking function, the stored-energy device is held in approximately the same installation position regardless of how much wear has occurred. In addition, however, the wear-compensating device 26 is also used before the drive system is put into service to adjust the entire clutch system in such a way that that the components provided in it occupy the exact positions relative to each other which are required to guarantee the correct clutch function and the proper braking function.

Figure 6:
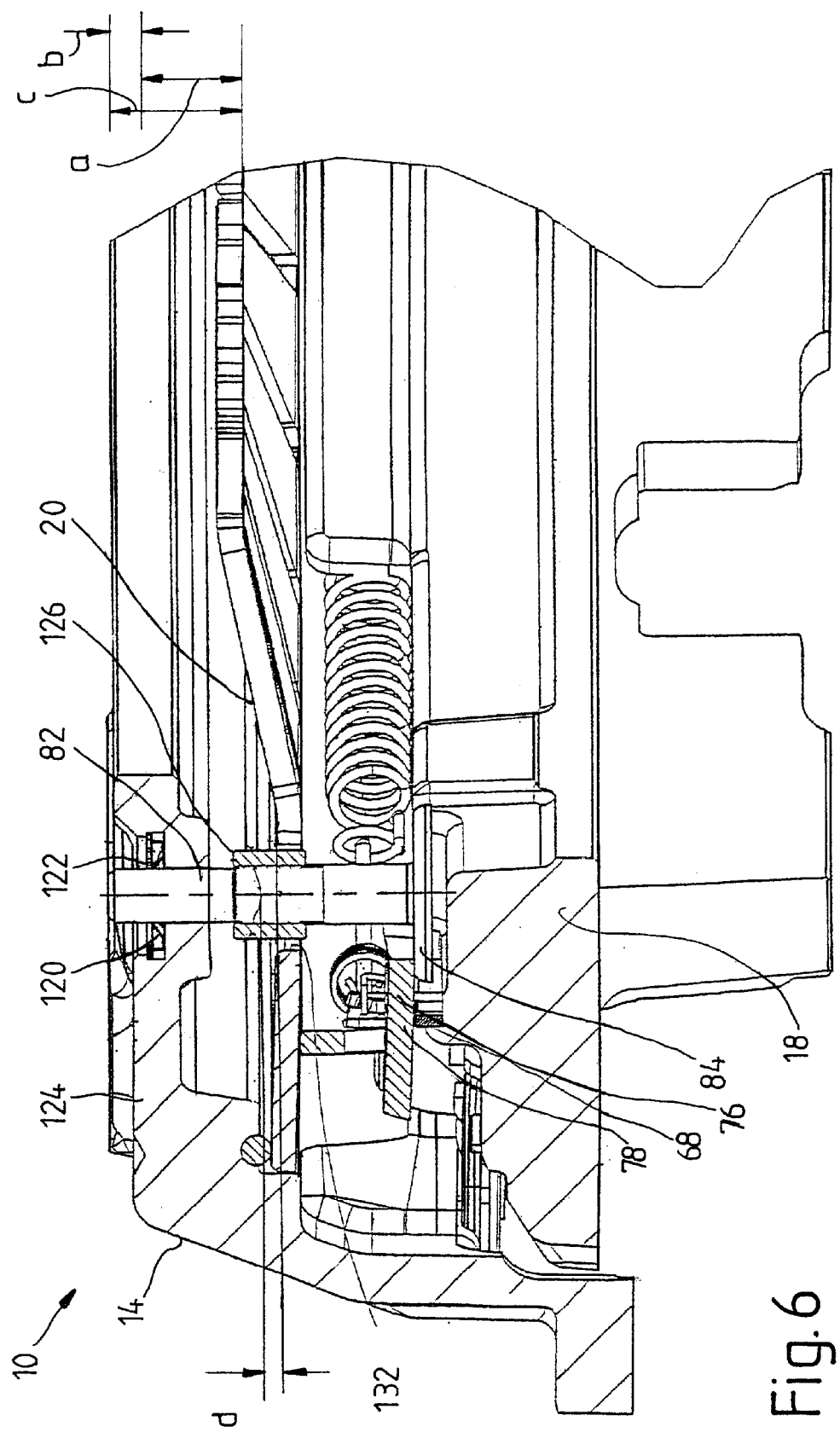
FIG. 6 is an enlarged section of a pressure plate assembly according to an alternative embodiment.
Figure 7:
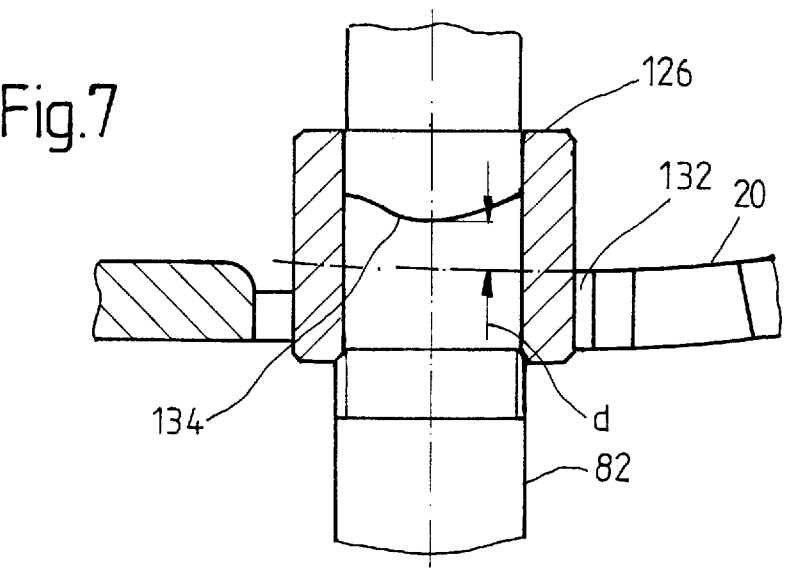
FIG. 7 is an enlarged, detailed view of the section of FIG. 6 showing the stop element.
Figure 8:
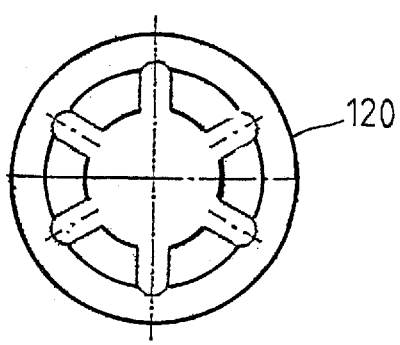
FIG. 8 is a plan view of a locking ring.

An alternative embodiment of the present invention is now described with reference to FIGS. 6–8. As can be seen in FIG. 6, the basic design of the friction clutch 10 is the same as that described in detail above. The clutch-release mechanism 30, not shown in FIG. 6, is also designed in the same way as previously described. There is a difference, however, in that the bolt-like stop element 82 on the housing 14 is not fixed in position by mating threads. Instead, the shaft section of the stop element 82 passes through an opening in the housing 14 and is secured on the housing 14 by a locking ring 120. The locking ring 120, which is seen from above in FIG. 8, is held on the housing 14 by a lock washer 122. The locking ring 120 has the effect of exerting a clamping action, a friction-clamping action, and/or a latching clamping action on the stop element 82 which prevents it from moving away from the housing 14 or away from the bottom area 124 of the housing. The stop element 82 can, however, be pushed relative to the housing 14 in the opposite direction, that is, in the direction toward the bottom area 124, i.e., away from the flywheel 16. This means that the locking ring 120 does not allow any shifting movement in a first direction of movement but offers essentially no resistance to the shifting movement in the other direction, the phrase "essentially no resistance" meaning here that the shifting forces which occur during operation and which will be mentioned again further below are able to shift the stop element 82.

It can also be seen that, approximately in the center of the length of the stop element 82, a sleeve-like driver element 126 is provided. This is shown in detail in FIGS. 9–11. The driver element 126 can be designed as a threaded nut and can be screwed onto a corresponding externally threaded section of the stop element 82. The position of the driver element 126 in the longitudinal direction of the stop element 82 can therefore be adjusted by turning it.

Figure 9:
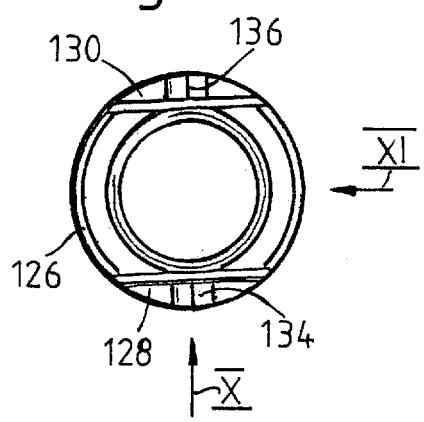
FIG. 9 is a plan view of a driver element provided for the stop element shown in FIG. 7.
Figure 10:
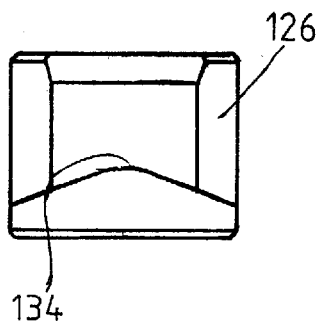
FIG. 10 is a side view of the driver element shown in FIG. 9, looking in direction X.
Figure 11:
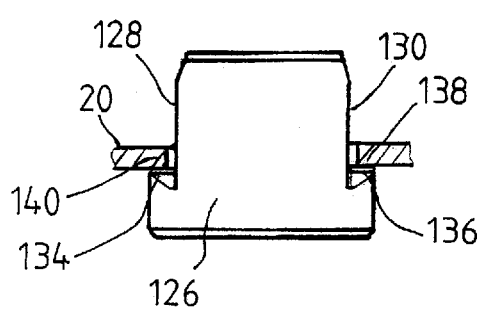
FIG. 11 is a side view of the driver element shown in FIG. 9, looking in direction XI.

As can be seen in FIGS. 9–11, the driver element 126 does not have a rotationally symmetric profile. Instead, it is flattened on two sides 128, 130. With this flattened contour, the driver element 126 engages in a correspondingly profiled opening 132 in the stored-energy device 20. This means that, in the state shown in FIGS. 6 and 7, the driver element 126 can no longer be turned on the stop element 82 or by the stop element 82. On the two flattened areas 128, 130, outward-projecting driver areas 134, 136 are provided on the driver element 126. These come to rest against corresponding areas 138, 140 of the stored-energy device 20 upon relative axial movement between the stored-energy device 20 and the driver element 126. When the stop element 82 is in the proper position with respect to the housing 14, therefore, it would be possible, upon execution of a clutch-release operation and the accompanying movement of the opening 132 of the stored-energy device 20 toward the bottom area 124 of the housing 14, for the driver areas 134, 136 of the driver element 126 to enter into mutual contact with the areas 138, 140 of the stored-energy device 20. A further displacement of the stored-energy device 20 would then cause the stop element 82 to shift upward in the diagram of FIG. 6 with respect to the housing 14, that is, toward the housing 14 or its bottom area 124.

The adjustment to be provided in conjunction with a friction clutch designed in this way is described below. In this adjustment process, the first step during the assembly of the friction clutch 10 is to arrange the driver element 126 at least approximately in such a position on the stop element 82 that two conditions are fulfilled. First, it should be ensured that, after the clutch system is correctly adjusted in the engaged state, the head 84 of the stop element 82 is in contact with the end area 78 of the arresting element 76 or just short of a state of mutual contact, so that a, for example, wear-induced displacement of the pressure plate 18 toward the flywheel causes the end area 78 of the arresting element 76 to move away from the slider 68 or allows the slider 68 to shift. Second, it must be guaranteed that a certain distance "d" is present between the driver areas 134, 136 of the driver element 126 and the corresponding areas 138, 140 of the stored-energy device 20. This distance must be selected so that, even though the driver areas 134, 136 may indeed come into contact with the areas 138, 140 of the stored-energy device 20 upon actuation of the clutch-release mechanism 30 to an extent corresponding to the brake-release stroke "c", the stop element 82 is not shifted by the previously discussed driver interaction between the stored-energy device 20 and the driver element 126 upon completion of the brake-release stroke "c". This means ultimately that, ideally, upon transition between the engaged state and a released state during the operation of a properly adjusted clutch, the end area 78 is positioned initially, in the engaged state, in mutual contact with or very close to the head 84 of the stop element 82, whereas, in the released state, the areas 138, 140 of the stored-energy device 20 are positioned in mutual contact with or very close to the driver areas 134, 136 of the driver element 126. If there has been no wear, a wear-compensating procedure does not take place, nor does the stop element 82 shift toward the housing 14. The relative positioning between the driver element 126 and the stop element 82 required for these conditions can be determined in advance and then set by the use of, for example, an appropriate tool during the assembly process.

The next step in the assembly of the clutch is to ensure that, while the driver element 126 is in the correct position initially with respect to the stop element 82, the stop element 82 is positioned in such a way that it is at least not any closer to the bottom area 124 of the housing 14 than it was when in the previously adjusted position shown in FIG. 6. That is, in the engaged state, the distance "d" between the driver areas 134, 136 and the corresponding areas 138, 140 of the stored-energy device 20 will be smaller than or at most equal to the distance "d" required for the correct adjustment, as shown in FIG. 6. Thus it is also allowable for the head 84 to be initially a certain distance away from the end area 78 of the arresting element 76.

If, proceeding from a positioning of this type, the clutch-release mechanism 30 is now actuated in such a way that its friction surface 116 shown in FIG. 5 presses against the brake disk 92, the stored-energy device 20 is also deformed or put under increased tension. The areas 138, 140 move toward the driver areas 134, 136 and possibly come to rest against them even before the brake release position is reached. If this is the case, the driver element 126 is shifted axially together with the stop element 82 during the remaining course of the release stroke, that is, during the remaining course of the stroke of the opening 132 in the stored-energy device 20. Once the brake release position is reached, the movement of the stored-energy device 20 and the displacement of the stop element 82 also come to an end.

When the clutch-release mechanism 30 is then released and the stored-energy device 20 is allowed to deform in the relaxation direction, the areas 138, 140 of the device move away from the areas 134, 136 of the driver element 126. In the course of this relaxation movement, the end area 78 approaches the head 84 of the stop element 82. If the previously described ideal positioning of the driver element 126 with respect to the stop element 82 was provided, the end area 78 now comes to rest or nearly to rest against the head 84 in the completely engaged state, but it is not prevented by the head from moving in common with the pressure plate 18. The clutch is thus now in the final, completely adjusted state.

If the driver element 126 was positioned slightly too close to the head 84, the end area 78 will strike the head 84 before the completion of the relaxation movement, so that a subsequent adjustment procedure will occur to the extent that the driver element 126 was too close to the head 84. After that, however, it is again guaranteed that the previously indicated conditions are fulfilled for a correctly adjusted clutch upon execution of clutch-engaging and clutch-releasing operations. If the driver element 126 was slightly too far away from the head 84, the mutual contact between the end area 78 and the head 84 will not occur until after the occurrence of a slight amount of wear, from which point on it is ensured that the stored-energy device 20 will always remain in the same installation position. From this it can be seen that it is advantageous but not mandatory with respect to the correct functioning of the system for the driver element 126 to be positioned with respect to the stop element 82 right from the beginning in such a way as to avoid any change in the installation position of the stored-energy device 20 from the time the clutch is put into operation; that is, the driver element 126 should not be positioned too far away from the head 84. On the other hand, it should be ensured that the adjusting distance of the wear-compensating device 26 is not already used up at the beginning as a result of an adjusting operation, which would mean that the adjusting distance is no longer available for wear compensation. It follows from this that the driver element 126 should also not be positioned too close to the head 84.

The present invention provides measures which allow the essentially automatic adjustment of a clutch system in such a way as to guarantee the optimal operation of both the clutch and of the transmission shaft brake over the entire service life of the clutch, without the need for any manual adjustment procedures during normal maintenance work.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A process for adjusting a friction clutch system, where the friction clutch system comprises:

a housing arrangement;

a pressure plate;

a stored-energy device supported against the housing and the pressure plate;

a wear-compensating device installed in the path of support between the stored-energy device and one of the housing arrangement and the pressure plate, said wear compensating device having a detection element on the pressure plate and a stop element which can be fixed in place with respect to the housing arrangement, said detection element cooperating with said stop element to detect the amount of wear which has occurred in the friction clutch;

a clutch-release mechanism for exerting force on the stored-energy device to carry out release operations; and a transmission shaft braking arrangement, which is activated when a brake-release position is reached during a clutch-release operation; said process comprising the following steps:
(a) using the clutch-release arrangement to adjust the stored-energy device to a basic pretension position from which the clutch-release arrangement moves through a brake-release stroke to reach the brake-release position; and
(b) while the stored-energy device is held on the basic pretension position, adjusting at least one of the stop element and the detection element in such a way that the stored-energy device is released from the basic pretension position and subsequent relaxation of the stored-energy device beyond the basic pretension position results in the activation of the wear-compensating device in such a way that after completion of an adjustment process, the stored-energy device is still essentially in its basic pretension position when the friction clutch is engaged.

2. A process according to claim 1, wherein the transmission shaft braking arrangement is activated by the force exerted by the clutch-release mechanism on a brake element connected to the transmission shaft for rotation in common.

3. A process according to claim 2, wherein an adjusting spacer is arranged between the brake element and the clutch-release arrangement and, in step (a), the clutch-release arrangement is actuated in such a way that it actuates the brake element by way of the adjusting spacer, where the adjusting spacer has a length which corresponds to the brake release stroke.

4. A process according to claim 1, wherein in step (b), the stop element is shifted axially with respect to the housing arrangement in such a way that said stop element comes to rest against the detection element.

5. A process according to claim 1, wherein the wear-compensating device comprises:
an adjusting element which can move with respect to the pressure plate upon execution of an adjusting operation, where the stored-energy device exerts force on the pressure plate by way of the adjusting element;
an essentially wedge-shaped slider which is pushed by pretension into an intermediate space formed between the pressure plate and the detection element, the detection element having the elasticity of a spring, said detection element having one end attached to the pressure plate and another end acting on the slider; and
a blocking section on one of the slider and the detection element, said blocking section limiting the adjusting movement of the adjusting element which occurs under pretension.

6. A process for adjusting a friction clutch system, where the friction clutch system comprises:
a housing arrangement;
a pressure plate;
a stored-energy device supported against the housing and the pressure plate;
a wear-compensating device installed in the path of support between the stored-energy device and one of the housing arrangement and the pressure plate, said wear compensating device having a detection element on the pressure plate and a stop element which can be fixed in place with respect to the housing arrangement, said detection element cooperating with the stop element to detect the amount of wear which has occurred in the friction clutch, where the stop element is supported on the housing arrangement in such a way as essentially to prevent movement away from the housing arrangement but essentially to not block movement toward the housing arrangement, and where at least one driver area is provided on the stop element, which driver area is approached by the stored-energy device during the execution of a clutch-release operation;
a clutch-release mechanism for exerting force on the stored-energy device in order to carry out release operations; and
a transmission shaft braking arrangement, which is activated when a brake-release position is reached during a clutch-release operation, said process comprising the following steps:
(a) providing at least one driver area on the stop element so that, when the friction clutch system is correctly adjusted, the actuation of the clutch-release arrangement by a brake-release stroke essentially sufficient to reach the brake release position has the result of reducing essentially to zero the distance between the minimum of one driver area and a cooperating area of the stored-energy device, and so that, in the engaged state, the detection element is in or near mutual contact with the stop element;
(b) positioning the stop element with respect to the housing arrangement so that actuation of the clutch-release arrangement sufficient to reach the brake-release position has the result that the gap between the at least one driver area of the stop element and the area of the stored-energy device cooperating with the minimum of one driver area is reduced essentially zero; and
(c) executing an actuation process of the clutch-release arrangement sufficient to reach the brake release position, where, if the distance between the minimum of one driver area and the stored-energy device is already zero before the brake-release position is reached, the stop element is shifted by the stored-energy device relative to the housing arrangement.

7. A process according to claim 6, further comprising a driver element connected to the stop element by a threaded joint, said at least one driver area being provided on said drive element.

8. A process according to claim 6, further comprising a locking ring element which holds the stop element with respect to the housing arrangement.

9. A process according to claim 6, wherein the wear-compensating device comprises:
an adjusting element which can move with respect to the pressure plate upon execution of an adjusting operation, the stored-energy device exerting force on the pressure plate by way of the adjusting element;

an essentially wedge-shaped slider, which is pushed by pretension into an intermediate space formed between the pressure plate and the detection element, the detection element having the elasticity of a spring, said detection element having one end attached to the pressure plate and another end acting on the slider; and a blocking section on one of the slider and on the detection element, said blocking section limiting the adjusting movement of the adjusting element under pretension.

* * * * *